United States Patent
Solomon (10) Patent No.: US 12,461,586 B2
(45) Date of Patent: Nov. 4, 2025

(54) METHOD AND APPARATUS FOR CONTROLLING BATTERY STORAGE MODE

(71) Applicant: Microchip Technology Incorporated, Chandler, AZ (US)

(72) Inventor: Robin Jonah Solomon, Chennai (IN)

(73) Assignee: Microchip Technology Incorporated, Chandler, AZ (US)

( * ) Notice: Subject to any disclaimer, the term of this patent is extended or adjusted under 35 U.S.C. 154(b) by 112 days.

(21) Appl. No.: 18/416,274

(22) Filed: Jan. 18, 2024

(65) Prior Publication Data
US 2025/0093939 A1   Mar. 20, 2025

(30) Foreign Application Priority Data
Sep. 14, 2023   (IN) .............................. 202341061894

(51) Int. Cl.
*G06F 1/3287*  (2019.01)
*G06F 1/26*  (2006.01)

(52) U.S. Cl.
CPC ............ *G06F 1/3287* (2013.01); *G06F 1/263* (2013.01)

(58) Field of Classification Search
None
See application file for complete search history.

(56) References Cited

U.S. PATENT DOCUMENTS

| | | | |
|---|---|---|---|
| 2010/0194348 A1 | 8/2010 | Wang et al. | |
| 2012/0324184 A1* | 12/2012 | Liu | G06F 11/1441 711/E12.103 |
| 2021/0271304 A1* | 9/2021 | Chang | G06F 1/3203 |
| 2021/0351608 A1 | 11/2021 | Cook et al. | |

OTHER PUBLICATIONS

International Search Report and Written Opinion of the International Searching Authority, Jun. 18, 2024, International Searching Authority, European Patent Office.

* cited by examiner

*Primary Examiner* — Paul Yen
(74) *Attorney, Agent, or Firm* — Shumaker, Loop & Kendrick, LLP; Ryan M. Corbett (57) ABSTRACT

A method of causing a first battery to exit a battery storage mode is provided. The method may include receiving, while the first battery is in the battery storage mode, a wake up signal indicating a power up event, generating an exit signal in response to the wake up signal, to cause the first battery to supply power to a first processing circuitry, waiting a predetermined time period following a predetermined edge of the exit signal, determining, after expiration of the predetermined time period, whether the first battery is supplying power to the first processing circuitry, and generating a second exit signal in response to determining that the first battery is not supplying power to the first processing circuitry. In the battery storage mode, a second battery provides power to the second processing circuitry to perform the method of causing the first battery to exit the battery storage mode.

19 Claims, 5 Drawing Sheets

METHOD AND APPARATUS FOR CONTROLLING BATTERY STORAGE MODE

CROSS-REFERENCE TO RELATED APPLICATION

The present application claims priority to Indian Provisional Patent Application No. 202341061894, entitled: Method and Apparatus for Controlling Battery Storage Mode, filed on Sep. 14, 2023, the contents of which are hereby incorporated by reference in their entirety.

TECHNICAL FIELD

The present disclosure relates generally to conserving charge of a battery for an electronic device, and more specifically to a method and apparatus for exiting a battery storage mode of a battery for an electronic device.

SUMMARY

According to an aspect of various examples, there is provided a method of causing a first battery to exit a battery storage mode. The method may include receiving, while the first battery is in a battery storage mode, a wake up signal indicating a power up event, generating an exit signal in response to the wake up signal, to cause the first battery to supply power to a first processing circuitry, waiting a predetermined time period following a predetermined edge of the exit signal, determining, after expiration of the predetermined time period, whether the first battery is supplying power to the first processing circuitry, and generating a second exit signal in response to determining that the first battery is not supplying power to the first processing circuitry. In the battery storage mode, a second battery may provide power to second processing circuitry to perform the method of causing the first battery to exit the battery storage mode. The first battery and the second battery may be respective portions of a single rechargeable battery. The exit signal may be a pulse signal having a predetermined pulse width.

The method may include entering an idle state in response to determining that the first battery is supplying power to the first processing circuitry. In response to determining that the first battery is not supplying power to the device, the method may include determining whether a maximum number of re-tries has been reached. In response to determining that the maximum number of re-tries has not be reached, the method may include generating the second exit signal to cause the first battery to supply power to the device. In response to determining that the maximum number of re-tries has been reached, the method may include causing the device to enter an idle state, in which the device waits to receive a second wake up signal.

According to an aspect of various examples, there is provided a controller to cause a first battery to exit a battery storage mode to provide power to a first processing circuitry. The controller may include a second processing circuitry to at least receive a wake up signal indicating a power up event while the first battery is the battery storage mode, generate an exit signal in response to the wake up signal, to cause the first battery to supply power to the first processing circuitry, wait a predetermined time period following a predetermined edge of the exit signal, determine, after expiration of the predetermined time period, whether the first battery is supplying power to the first processing circuitry, and generate a second exit signal in response to determining that the first battery is not supplying power to the first processing circuitry. In the battery storage mode, a second battery provides power to the second processing circuitry. The exit signal may be a pulse signal having a predetermined pulse width.

The second processing circuitry may enter an idle state in response to determining that the first battery is supplying power to the first processing circuitry. The second processing circuitry may, in response to determining that the first battery is not supplying power to the first processing circuitry, determine whether a maximum number of re-tries has been reached, and in response to determining that the maximum number of re-tries has not be reached, generate the second exit signal to cause the first battery to supply power to the first processing circuitry. The second processing circuitry may, in response to determining that the maximum number of re-tries has been reached, cause the device to enter an idle state, in which the device waits to receive a second wake up signal. The first battery and the second battery may be respective portions of a single rechargeable battery. The first processing circuitry may initiate a boot sequence after the first battery begins supplying power to the first processing circuitry.

According to an aspect of various examples, there is provided a controller to cause a first battery to exit a battery storage mode. The controller may include a first processing circuitry to be powered by an output of the first battery, and a second processing circuitry, powered by an output of a second battery, to at least receive a wake up signal indicating a power up event while the first battery is in the battery storage mode, generate an exit signal in response to the wake up signal, to cause the first battery to supply power to the first processing circuitry, wait a predetermined time period following a predetermined edge of the exit signal, determine whether the first battery is supplying power to the first processing circuitry, and generate a second exit signal in response to determining that the first battery is not supplying power to the first processing circuitry. In the battery storage mode, the first battery may not provide power to the first processing circuitry. The first processing circuitry may initiate a boot sequence after the first battery begins supplying power to the first processing circuitry. The exit signal may be a pulse signal that has a predetermined pulse width.

The second processing circuitry may enter an idle state in response to determining that the first battery is supplying power to the first processing circuitry The second processing circuitry may, in response to determining that the first battery is not supplying power to the first processing circuitry, determine whether a maximum number of re-tries has been reached, and in response to determining that the maximum number of re-tries has not be reached, generate the second exit signal to cause the first battery to supply power to the first processing circuitry. The second processing circuitry may, in response to determining that the maximum number of re-tries has been reached, cause the second processing circuitry to enter an idle state, in which the second processing circuitry waits to receive a second wake up signal. The first battery and the second battery may be respective portions of a single rechargeable battery.

DETAILED DESCRIPTION OF VARIOUS EXAMPLES

Reference will now be made in detail to the following various examples, which are illustrated in the accompanying drawings, wherein like reference numerals refer to like elements throughout. The following examples may be embodied in various forms without being limited to the examples set forth herein.

Portable electronic devices such as, without limitation, laptop computers, tablets, and mobile telephones include one or more batteries that provide power to the circuitry contained in these devices. These batteries are often charged when they are inserted into the portable electronic device during the manufacturing process so that the battery is able to provide power to the device and enable a customer to use the device immediately upon purchasing the device without having to first charge the battery. However, after the charged battery is inserted into the device during the manufacturing process, the battery may experience leakage that reduces the charge of the battery. As the amount of time between completing the manufacturing process and the customer purchase of the device increases, the amount of charge left in the main battery may be less, potentially leaving an insufficient charge on the battery to turn on the device without first charging the battery. Therefore, a device and method for limiting battery leakage and extending the amount of time between manufacturing and purchase that the battery may retain a charge sufficient to power the device may be needed.

After the manufacturing process is complete, the main battery may be put in a battery storage mode to reduce the amount of leakage. In the battery storage mode, the main battery may not provide power to the device in order to conserve charge stored in the main battery. Therefore, there is a need for a process and device to bring the main battery out of the battery storage mode at first boot or any subsequent boot where the battery is in storage mode.

Figure 1:
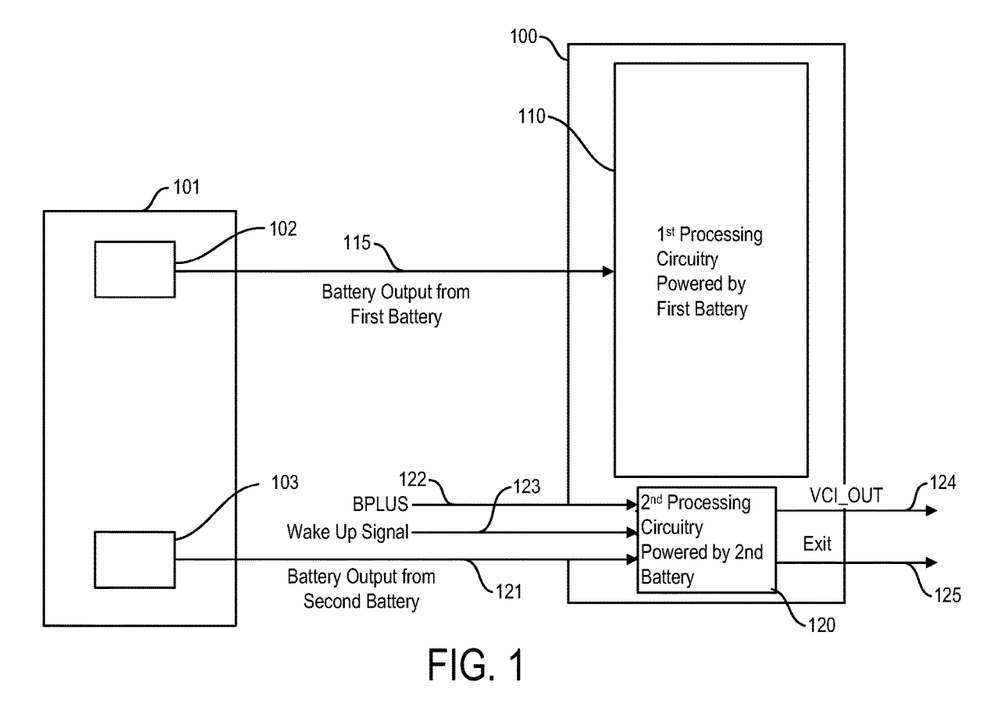
FIG. 1 shows a block diagram of a controller for exiting a battery storage mode of a battery according to various examples.

FIG. 1 shows a block diagram of a controller 100 for exiting a battery storage mode of a battery according to various examples. The controller 100 according to various examples may be an embedded controller used to control a bootup process for a portable electronic device such as, without limitation, a laptop computer, tablet, or mobile telephone. The portable electronic device may include one or more batteries to provide power to various circuitry contained in the device. For example, the portable electronic device may include one battery that may be partitioned into a primary portion for providing a main power supply for the device, and a second or back-up portion for providing a power supply to certain components of the device. For example, the second or back-up portion may supply power to a real-time clock (RTC) rail used for providing power to a real-time clock that operates using very low power even when the rest of the device is not powered. According to various examples, the portable electronic device may include separate batteries, a main battery for providing the main power supply for the device, and a separate back-up battery that provides a power supply to certain components of the device, such as the RTC rail. For example, the back-up battery may be in the form of a coin cell.

As shown in FIG. 1, the controller 100 may include first processing circuitry 110 that is powered by an output of a first battery 102, which may be a main battery, and second processing circuitry 120 that is powered by an output of a second battery 103, such as a second or back-up portion or a coin cell, for example. According to various examples, the first battery 102 and the second battery 103 may be respective portions of a single rechargeable battery 101. Second processing circuitry 120 may receive power via the RTC rail from the second battery 103. The first processing circuitry 110 powered by the first battery 102 may receive a battery output 115 from the first battery 102, and the second processing circuitry 120 may receive an output 121 from the second battery 103. When the first processing circuitry 110 receives a battery output 115 from the first battery 102, this power may supply power to the second processing circuitry 120, thereby saving power stored in the second battery 103 for use only when battery output 115 from the first battery 102 is not supplied. The second processing circuitry 120 may also receive a battery output digital indicator signal (BPLUS) 122 that indicates whether the first battery 102 is supplying power to the first processing circuitry 110. The second processing circuitry 120 may also receive a wake up signal 123 indicating that a power up or wake up event has occurred. For example, the wake up signal indicating a power up event may indicate that the power button of the portable electronic device has been pressed, or a laptop computer has been opened. Circuity to provide wake up signal 123 (not shown) may be part of the second processing circuitry 120. The second processing circuitry 120 may output a voltage control interface output (VCI_OUT) signal 124 based on the wake up signal 123 to enable power from the first battery 102 to be provided to first processing circuitry 110, and an exit signal 125 to cause the first battery 102 to exit the battery storage mode and supply power to the first processing circuitry 110, as explained in more detail below. For example, the exit signal may trigger a battery management unit to drive a first field effect transistor (FET) that allows power from the first battery 102 to be supplied towards the first processing circuitry 110, and the VCI_OUT signal 124 may be used to enable a voltage regulator that provides power from the first battery 102 to the first processing circuitry 110 at the required voltage.

Figure 2:
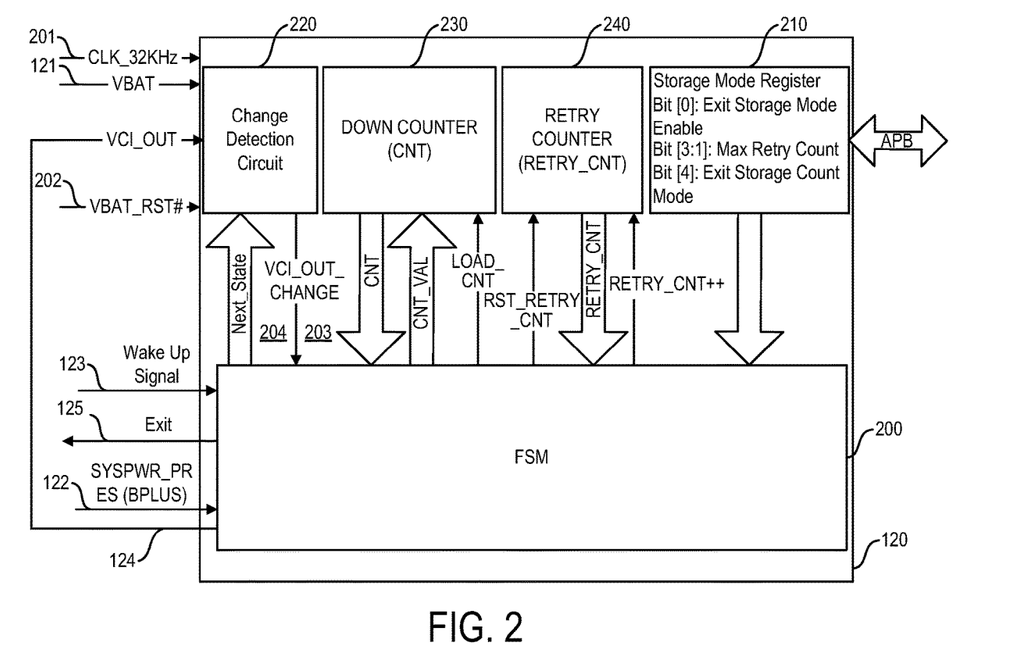
FIG. 2 shows a block diagram of the second processing circuitry of FIG. 1 according to various examples.

FIG. 2 shows a block diagram of the second processing circuitry 120 of FIG. 1 according to various examples. The second processing circuitry 120 may include a finite state machine (FSM) 200 to control a process for causing the first battery 102 to exit a battery storage mode. The second processing circuitry 120 may include a storage mode register 210 to store a plurality of bits used by the FSM 200 to control the process of exiting the battery storage mode, as explained in more detail below. For example, the storage mode register 210 may store an Exit Storage Mode Enable bit to enable the process of causing the first battery 102 to exit the battery storage mode. The storage mode register 210 may include three Max Retry Count bits to set the maximum number of attempts the FSM 200 may make to cause the first battery 102 to exit the battery storage mode. Although the storage mode register 210 in FIG. 2 uses three Max Retry Count bits, a different number of bits may be used. The storage mode register 210 may also include an Exit Storage Count Mode bit to indicate a count mode that is used to cause the first battery 102 to exit the battery storage mode. For example, the storage count mode bit may indicate whether the controller is operating in a fixed count mode or an incremental count mode, as explained in more detail below.

The second processing circuitry 120 may also include a change detection circuit 220 to detect a change to cause the first battery 102 to exit the battery storage mode. For example, a change may be the pressing of a power button on the electronic device, or opening a laptop computer lid. The change detection circuit 220 may receive the voltage control interface output (VCI_OUT) signal 124 from the FSM 200, and may output a VCI_OUT_CHANGE signal 203 to the FSM 200 to indicate when the VCI_OUT signal has changed from one logic state to another logic state, as explained in more detail below. The change detection circuit 220 may also receive a next state signal (Next_State) 204 from the FSM 200, as explained further below.

The second processing circuitry 120 may also include a down counter 230 that is coupled to the FSM 200, wherein down counter 230 is to count down from a count value (CNT_VAL) that is provided by the FSM 200. Although the example of FIG. 2 shows a down counter 230 that counts down from a count value, an up counter may also be used to count up to a count value. The FSM 200 may transmit a load count signal (LOAD_CNT) to cause the down counter to load the count value (CNT_VAL) from which the down counter 230 will count down. The down counter 230 may output a count signal (CNT) to the FSM 200 to facilitate exiting the battery storage mode, as explained further below.

The second processing circuitry 120 may also include a retry counter 240 that is coupled to the FSM 200, and is to store a count of the number of retry attempts (RETRY_CNT) the FSM 200 has performed to cause the first battery 102 to exit the battery storage mode. The retry counter 240 may provide the number of retry attempts (RETRY_CNT) to the FSM 200, and the FSM 200 may increment the number of retry attempts as additional retry attempts are performed by transmitting a retry increment signal (RETRY_CNT++) to the retry counter 240. The FSM 200 may also reset the number of retry attempts by transmitting a retry count reset signal (RST_RETRY_CNT) to the retry counter 240.

The second processing circuitry 120 may receive a clock signal (CLK_32 KHz) 201 to coordinate operation of the FSM 200. The clock signal (CLK_32 KHz) 201 in FIG. 2 is shown as a 32 KHz clock signal, though other frequencies may be used. The second processing circuitry 120 may also receive a second battery reset signal (VBAT_RST) 202 to reset the change detection circuit 220, as explained further below.

Figure 3:
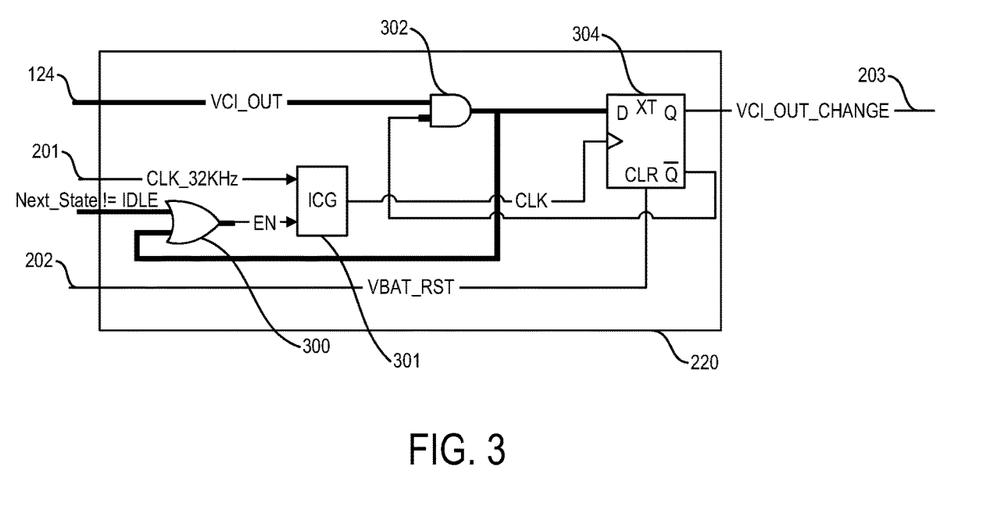
FIG. 3 shows a change detection circuit according to various examples.

FIG. 3 shows the change detection circuit 220 of FIG. 2 according to various examples. The change detection circuit 220 of FIG. 3 may receive the VCI_OUT signal 124, which VCI_OUT signal 124 may be generated responsive to the wake up signal 123, the clock signal (CLK_32 KHz) 201, the Next_State signal 204 from the FSM 200, and the second battery reset signal (VBAT_RST) 202, and may output the VCI_OUT_CHANGE signal 203 to indicate when the VCI_OUT 124 signal has changed from one logic state to another logic state. The wake up signal 123 may be an OR of multiple wake up conditions, including depressing the power button, raising a laptop lid, or attaching the laptop to a power mains, and the VCI_OUT signal 124 may be asserted responsive to the wake up signal 123. The change detection circuit 220 may include an OR gate 300, an integrated clock gate 301, an AND gate 302 and a flip-flop or latch, such as the D flip-flop 304 shown in the example embodiment of FIG. 3. When the portable electronic device is in a battery storage mode, the VCI_OUT_CHANGE signal 203 is a logic low level because the VCI_OUT signal 124, received at a first input of the AND gate 302, has not changed from its initial, default state, of a logic low. A logic high signal is output from the inverted output of the D flip flop 304 to one input of the AND gate 302, such that when the VCI_OUT signal 124 becomes a logic high level, i.e. becomes active, the AND gate 302 outputs a logic high signal to the D input of the D flip flop 304. Upon a predetermined edge of the clock signal CLK, the Q output of the D flip flop 304 (i.e., VCI_OUT_CHANGE signal 203) becomes a logic high level to indicate that the logic level of the VCI_OUT signal 124 has changed from inactive low to active high. The second battery reset signal (VBAT_RST) 202 may be used to clear the D flip-flop 304 so as to reset the Q output of the D flip flop 302 to a logic low level.

As shown in the example embodiment of FIG. 3, the clock signal CLK may be gated to save power. More specifically, the change detection circuit 220 may include the OR gate 300 having a first input to receive the next state signal (Next_State) 204 from the FSM 200. The next state signal (Next_State) 204 is a logic high when the next state is not the idle state (see FIG. 4). The OR gate 300 may include a second input to receive the output of the AND gate 302, and an output terminal that outputs an enable signal EN to the integrated clock gate (ICG) 301. When the Next_State signal 204 indicates that the next state is not the Idle state (as described below), or the output of AND gate 302 is logic high, the OR gate 300 will output an active, e.g. a logic high enable signal EN to the ICG 301. The ICG 301 also receives the clock signal (CLK_32 KHz) 201, which is output to the CLK pin of the D flip flop 304 based on the enable signal EN. In particular, when the output of OR gate 300 is logic high, the ICG 301 outputs the clock signal CLK_32 KHz 201 to the CLK pin of the D flip flop 304. When the output of OR gate 300 is logic low, the CLK pin of the D flip flop 304 remains logic low, i.e. the clock signal CLK_32 KHz 201 is not passed through to the CLK pin of the D flip flop 304. Since the inverted output of the D flip flop 304 is fed back to a second input of the AND gate 302, when VCI_OUT goes high, the Q output of D flip flop 304 will change to high responsive to the next clock of clock signal CLK_32 KHz 201, when passed through integrated clock gate 301. The inverted output of D flip flop 304, will change to low, which will therefore change the D input of D flip flop 304 to low. Assuming the NEXT_State signal 204 is high, the output of the D flip flop 304, i.e. signal VCI_OUT CHANGE 203, will then fall back to low on the next clock of CLK_32 KHz 201. Thus, in the event that the NEXT_State signal is high, signal VCI_OUT_CHANGE 203 will generate a pulse of width equal responsive to the frequency of CLK_32 KHz 201, in response to VCI_OUT going high. In the event that the NEXT_State signal is low, signal VCI_OUT_CHANGE 203 will generate a logic high signal until reset by either signal VBAT_RST 202 or the NEXT_State signal going high to enable passing of the CLK_32 KHz 201.

Figure 4:
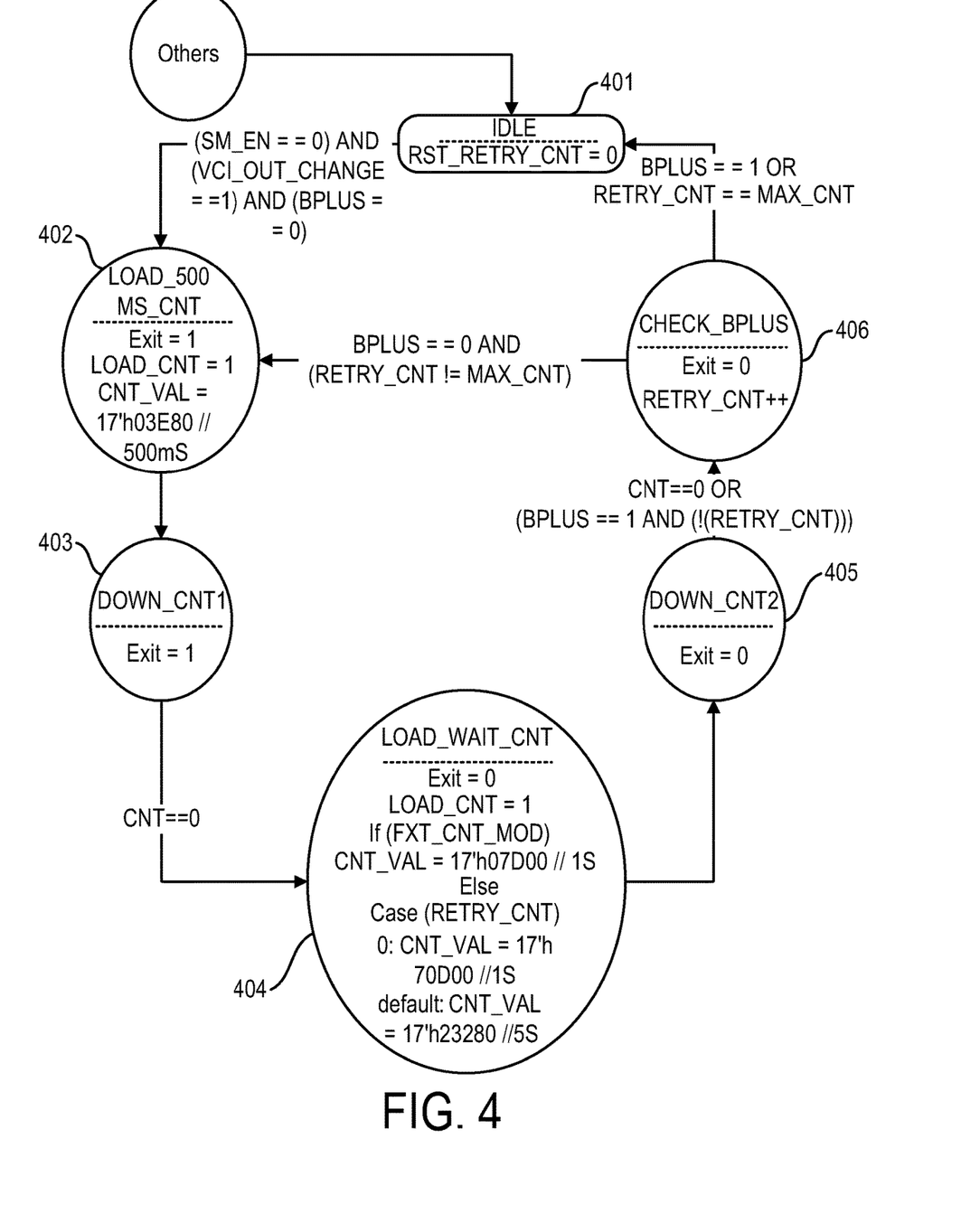
FIG. 4 shows a flow chart for a state machine to implement a method of exiting a battery storage mode according to various examples.
Figure 5:
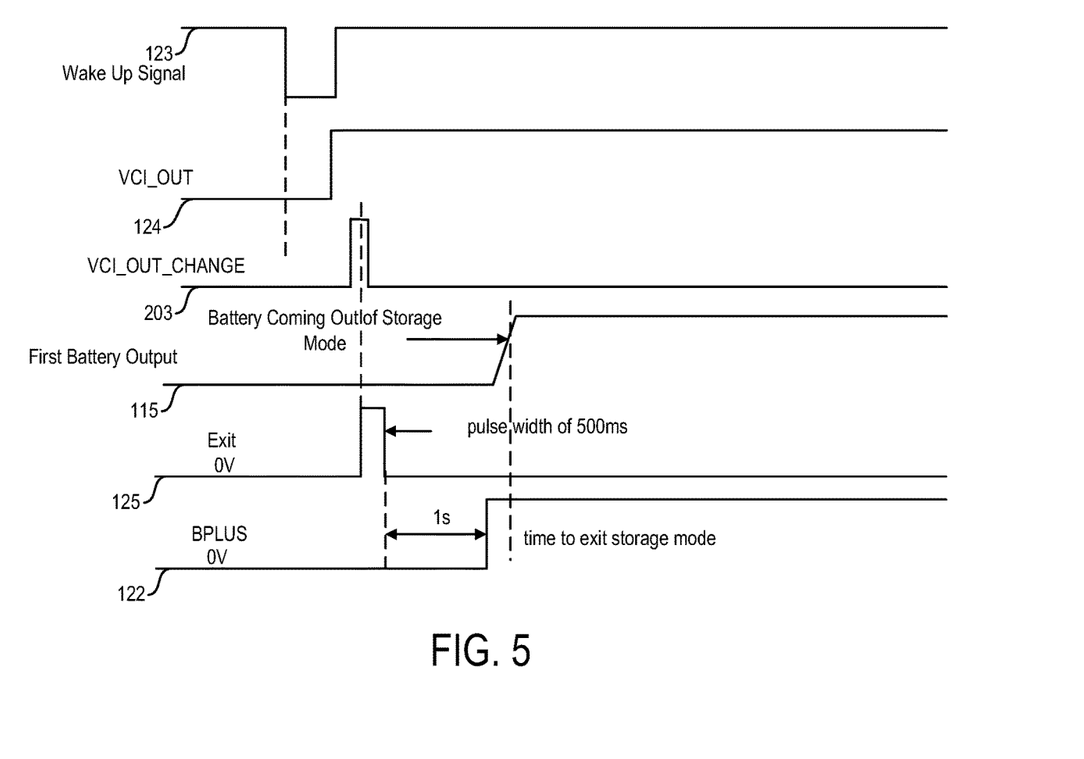
FIG. 5 shows a timing diagram showing various signals associated with a method of exiting a battery storage mode according to various examples.

FIG. 4 shows a flow chart for the FSM 200 to implement a method of exiting a battery storage mode according various examples, and FIG. 5 shows a timing diagram showing various signals associated with a method of exiting a battery storage mode according to various examples. Referring to FIGS. 4 and 5, the example method for exiting the battery storage mode begins in an Idle state 401, in which the first battery 102 is in a storage mode. In the Idle state 401, the number of retry counts (RETRY_CNT) stored in retry counter 240 is set to zero by the retry count reset signal RST_RETRY_CNT output by the FSM 200. When a power up event occurs, such as a user pressing a power button of the portable electronic device or the opening of a laptop computer, a signal indicating the power up event is generated and is received by the controller. In the example embodiment of FIG. 5, the wake up signal 123 is a pulse which changes from a logic high level to a logic low level and then changes back to a logic high level to indicate the occurrence of the power up event. In response to the wake up signal 123 indicating the occurrence of the power up event, in particular the rising edge of the wake up signal 123, the VCI_OUT signal 124 generated by second processing circuit 120, e.g. by FSM 200, may change from a logic low level to a logic high level. As explained above in connection with FIG. 3, the change detection circuit 220 of the second processing circuitry 120 receives the VCI_OUT signal 124 and outputs the VCI_OUT_CHANGE signal 203 at a logic high level, shown as a positive going pulse of width equal responsive to the frequency of CLK_32 KHz 201, to indicate that the VCI_OUT signal 124 has changed logic states from low to high.

When the VCI_OUT_CHANGE signal 203 becomes logic high, if the Exit Storage Mode Enable bit (SM_EN) stored in the storage mode register 210 is enabled (set to zero in FIG. 4), and the battery output digital indicator signal BPLUS 122 indicates that the first battery 102 is not supplying power (logic low in FIG. 4), the state machine enters the LOAD_500MS_CNT state 402. In this state, the exit signal SYS_PRES #125 becomes logic high, as shown in FIG. 5, and a counter is set to a predetermined time determining the width of the exit signal. In the example embodiment of FIGS. 4 and 5, the predetermined width of the exit signal is 500 ms though other widths may be used. In the LOAD_500MS_CNT state 402, the FSM 200 outputs a load count signal LOAD_CNT and a count value CNT_VAL to the down counter 230 to cause the down counter 230 set the count CNT equal to the count value CNT_VAL. In the example of FIGS. 4 and 5, the count value CNT_VAL may be equivalent to 500 ms.

The FSM 200 then transitions to a DOWN_CNT1 state 403, in which the down counter 230 counts down from the count value CNT_VAL until the down counter 230 reaches zero. During the DOWN_CNT1 state 403, the exit signal SYS_PRES #125 remains logic high.

When the down counter 230 reaches zero, the down counter 230 outputs a count signal CNT=0 to the FSM 200 indicating that the down counter 230 has reached zero. In response to receiving the count signal CNT=0 indicating that the down counter 230 has reached zero, the FSM 200 enters the LOAD_WAIT_CNT state 404, in which the FSM 200 causes the exit signal 125 to be set back to logic low level, and outputs a load count signal LOAD_CNT and a count value CNT_VAL to the down counter 230 to set a predetermined time period to wait following a predetermined edge of the exit signal 125 (e.g., the falling edge) before determining whether the first battery 102 is supplying power to the first processing circuitry 110.

For example, if the Exit Storage Count Mode bit stored in the storage mode register 210 is set to indicate a fixed count mode, the count value CNT_VAL may be one second. If the Exit Storage Count Mode bit is set to indicate an incremental count mode, i.e. a mode wherein a delay time to wait for the main battery to exit the battery storage mode for a first instance may be different than a delay provided for subsequent instances, the count value CNT_VAL may be set to a maximum of five seconds. The down counter 230 sets the count CNT equal to the count value CNT_VAL.

After the count CNT is set, the FSM enters the DOWN_CNT2 state 405, in which the down counter 230 counts down from the predetermined amount of time set in the LOAD_WAIT_CNT state 404 to wait following the falling edge of the exit signal 125 before determining whether the first battery 102 is supplying power to the first processing circuitry 110. During the DOWN_CNT2 state 405, the exit signal 125 remains in a logic low state. When the down counter 230 reaches zero, the down counter outputs the count value CNT=0 to the FSM 200, which causes the FSM 200 to enter the CHECK_BPLUS state 406. Alternatively, even if the count value CNT is not zero, if the battery output digital indicator signal BPLUS 122 is logic high, indicating that power is being provided by the first battery 102, and the number of retry attempts RETRY_CNT stored in the retry counter 240 is not equal to zero, the FSM 200 will enter the CHECK_BPLUS state 406. In the CHECK_BPLUS state 406, the FSM 200 increments the number of retry attempts RETRY_CNT stored in the retry counter 240, and provided to the FSM 200, by transmitting a retry increment signal RETRY_CNT++ to the retry counter 240, to indicate that an attempt to exit the battery storage mode has occurred. In the CHECK_BPLUS state 406, the FSM 200 determines whether the battery output digital indicator signal BPLUS 122 is logic high or low. If the battery output digital indicator signal BPLUS 122 is logic low and the number of retry attempts RETRY_CNT is less than the maximum number of permitted retries, as indicated by the Max Retry Count bits stored in the storage mode register 210, the FSM 200 returns to the LOAD_500MS_CNT state 402 to generate a second exit signal by setting the exit signal SYS_PRES #125 to a logic high level to again attempt to cause the first battery 102 to exit the battery storage mode. Alternatively, if the battery output digital indicator signal BPLUS 122 is logic high, or the number of retries equals the maximum number of permitted retries, the FSM 200 returns to the Idle state 401. The battery output digital indicator signal BPLUS 122 being in a logic high state indicates that the first battery output 115 has begun supplying power to the first processing circuitry 110 so a full boot up process can occur. As shown in FIG. 4, any other states ("Others" in FIG. 4) of the FSM 200 will default to the Idle state 401, e.g., any unused states. By placing the device in the battery storage mode during manufacturing, and exiting the battery storage mode as explained herein, the initial charge of the first battery 102 may last longer.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method of causing a first battery to exit a battery storage mode, the method comprising:
   receiving, while the first battery is in the battery storage mode, a wake up signal indicating a power up event;
   generating an exit signal in response to the wake up signal, to cause the first battery to supply power to a first processing circuitry;
   waiting a predetermined time period following a predetermined edge of the exit signal;
   determining, after expiration of the predetermined time period, whether the first battery is supplying power to the first processing circuitry; and
   generating a second exit signal in response to determining that the first battery is not supplying power to the first processing circuitry;
   wherein, in the battery storage mode, a second battery provides power to second processing circuitry to perform the method of causing the first battery to exit the battery storage mode.

2. The method of claim 1 wherein the first battery and the second battery are respective portions of a single rechargeable battery.

3. The method of claim 1, wherein the exit signal is a pulse signal having a predetermined pulse width.

4. The method of claim 1 comprising entering an idle state in response to determining that the first battery is supplying power to the first processing circuitry.

5. The method of claim 1 comprising:
   in response to determining that the first battery is not supplying power to the first processing circuitry, determining whether a maximum number of re-tries has been reached; and
   in response to determining that the maximum number of re-tries has not been reached, generating the second exit signal to cause the first battery to supply power to the first processing circuitry.

6. The method of claim 5 comprising:
   in response to determining that the maximum number of re-tries has been reached, causing the second processing circuitry to enter an idle state, in which the second processing circuitry waits to receive a second wake up signal.

7. A controller to cause a first battery to exit a battery storage mode to provide power to a first processing circuitry, the controller comprising:
   a second processing circuitry to at least:
      receive a wake up signal indicating a power up event while the first battery is in the battery storage mode;
      generate an exit signal in response to the wake up signal, to cause the first battery to supply power to the first processing circuitry;
      wait a predetermined time period following a predetermined edge of the exit signal;
      determine, after expiration of the predetermined time period, whether the first battery is supplying power to the first processing circuitry; and
      generate a second exit signal in response to determining that the first battery is not supplying power to the first processing circuitry;
   wherein in the battery storage mode a second battery provides power to the second processing circuitry.

8. The controller of claim 7, wherein the exit signal is a pulse signal that has a predetermined pulse width.

9. The controller of claim 7, wherein the second processing circuitry is to enter an idle state in response to determining that the first battery is supplying power to the first processing circuitry.

10. The controller of claim 7, wherein the second processing circuitry is to:
    in response to determining that the first battery is not supplying power to the first processing circuitry, determine whether a maximum number of re-tries has been reached; and
    in response to determining that the maximum number of re-tries has not been reached, generate the second exit signal to cause the first battery to supply power to the first processing circuitry.

11. The controller of claim 10, wherein the second processing circuitry is to, in response to determining that the maximum number of re-tries has been reached, cause the second processing circuitry to enter the idle state, in which the second processing circuitry waits to receive a second wake up signal.

12. The controller of claim 7, wherein the first battery and the second battery are respective portions of a single rechargeable battery.

13. The controller of claim 8, wherein the first processing circuitry is to initiate a boot sequence after the first battery begins supplying power to the first processing circuitry.

14. A controller to cause a first battery to exit a battery storage mode, the controller comprising:
    a first processing circuitry to be powered by an output of the first battery; and
    a second processing circuitry, powered by an output of a second battery, the second processing circuitry to at least:
       receive a wake up signal indicating a power up event while the first battery is in the battery storage mode;
       generate an exit signal in response to the wake up signal, to cause the first battery to supply power to the first processing circuitry;
       wait a predetermined time period following a predetermined edge of the exit signal;
       determine whether the first battery is supplying power to the first processing circuitry; and
       generate a second exit signal in response to determining that the first battery is not supplying power to the first processing circuitry;
    wherein in the battery storage mode, the first battery does not provide power to the first processing circuitry; and
    wherein the first processing circuitry is to initiate a boot sequence after the first battery begins supplying power to the first processing circuitry.

15. The controller of claim 14, wherein the exit signal is a pulse signal that has a predetermined pulse width.

16. The controller of claim 14, wherein the second processing circuitry is to enter an idle state in response to determining that the first battery is supplying power to the first processing circuitry.

17. The controller of claim 14, wherein the second processing circuitry is to:
    in response to determining that the first battery is not supplying power to the first processing circuitry, determine whether a maximum number of re-tries has been reached; and
    in response to determining that the maximum number of re-tries has not been reached, generate the second exit signal to cause the first battery to supply power to the first processing circuitry.

18. The controller of claim 17, wherein the second processing circuitry is to, in response to determining that the maximum number of re-tries has been reached, cause the second processing circuitry to enter the idle state, in which the second processing circuitry waits to receive a second wake up signal.

19. The controller of claim 14, wherein the first battery and the second battery are respective portions of a single rechargeable battery.

\* \* \* \* \*